April 4, 1950     M. E. BENNETT     2,503,021

BEARING WICK RETAINER

Filed March 18, 1949

Inventor:
Maurice E. Bennett,
by Prowell & Mack
His Attorney.

Patented Apr. 4, 1950

2,503,021

UNITED STATES PATENT OFFICE 2,503,021

BEARING WICK RETAINER

Maurice E. Bennett, Fort Wayne, Ind., assignor to General Electric Company, a corporation of New York Application March 18, 1949, Serial No. 82,254

5 Claims. (Cl. 308—132)

This invention relates to bearing oiling systems and more particularly to oiling systems of the type having a wick which feeds lubricant to a rotating shaft.

An object of my invention is to provide an improved and simplified retainer for such a bearing wick.

A further object of my invention is the provision of a bearing wick retainer which is easy and inexpensive to manufacture and which may be readily assembled in a bearing housing.

In carrying out my invention in one form, I provide an offset bearing wick retainer of resilient material having a projection on one offset surface thereof. The projection engages an opening in the outer wall of the bearing housing through which lubricant is supplied to the bearing. The other offset portion of the retainer is composed of three tines. The two outer tines engage grooves in the sides of supporting ribs within the bearing housing while the center tine contacts the bearing wick and, because of the resiliency of the tine, presses the wick against the shaft.

Figure 1:
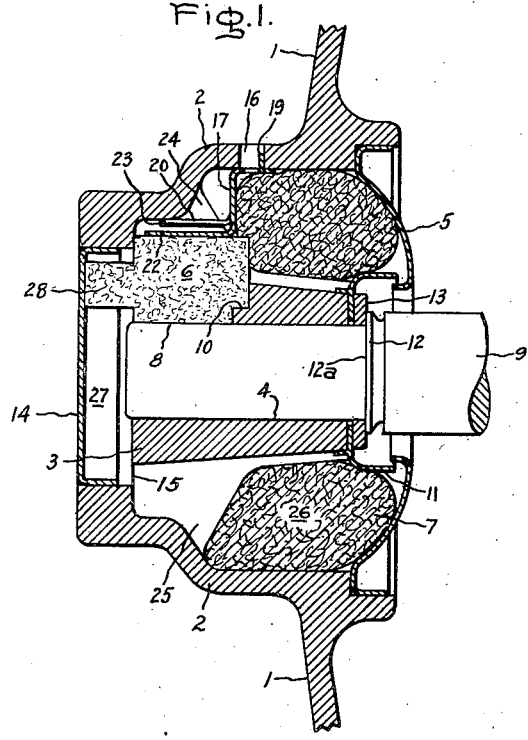
Figure 2:
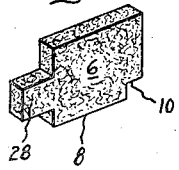
Figure 3:
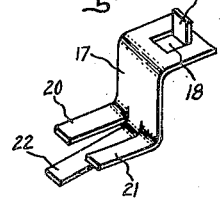

For a clearer and more complete understanding of my invention, reference should be had to the accompanying drawing, Fig. 1 of which is a sectional view of a bearing housing in which the invention is incorporated; Fig. 2 is a perspective view of a typical wick; and Fig. 3 is a perspective view of the bearing wick retainer.

Referring to Fig. 1 of the drawing, there is shown an end shield 1 having an integral bearing housing embodying my invention. The bearing housing is formed by an outwardly flaring wall 2 of the end shield, and an inwardly tapering re-entrant wall 3 spaced from the outer wall. The inner surface 4 of re-entrant, or bearing support wall 3 is cylindrical and constitutes the bearing surface. A plurality of radially disposed ribs, of which ribs 24 and 25 are typical, are spaced around the periphery of re-entrant wall 3, joining the latter to wall 2. Two of these ribs, including rib 24, also assist in supporting the bearing wick retainer in a manner which is described later. An annular lubricant chamber 26 is formed around the bearing support 3 by a plate, or closure 5 which is sealed in an annular recess in the inner surface of end shield 1.

In order to feed lubricant from the reservoir which is formed by this lubricant chamber, capillary means is provided which substantially fills the chamber and surrounds the bearing. In the embodiment shown, the capillary means is composed of a wick 6 of material such as felt, and absorbent packing material 7 which may be wool waste or other suitable material. The upper wall of bearing support 3 is provided with a longitudinal opening in which lubricant wick 6 is positioned. A surface 8 of the wick, which is shown in detail in Fig. 2 of the drawing, rests on the journal, or bearing surface of a shaft 9 which is rotatably positioned on bearing surface 4. The bottom surface 10 of a recess in wick 6 rests on a corresponding ledge projecting from the innermost surface of the opening in bearing wall 3 to provide radial support for the wick. The diagonally opposite corner of wick 6 is positioned against wall 2 while a projection 28 on the opposite end of the wick is positioned against an end cap 14; together wall 2 and end cap 14 maintain the wick in the correct position longitudinally. Lateral support for the wick is provided by the sides of the opening in wall 3.

It can be readily understood that the lubricant which is fed to the journal surface of the shaft by the wick will flow out the ends of the bearing and it is, therefore, necessary to provide means for returning the lubricant to the packing material 7 to be re-fed to the bearing. Means must also be provided to keep the packing material 7, which surrounds the shaft 9 at the inner end of the bearing, away from the shaft. In order to prevent the packing material 7 from coming in contact with the shaft, the bearing wall 3 is provided with an annular retainer member 11. Retainer member 11 has an angular portion which is secured to the innermost shoulder of wall 3 and an outwardly flaring portion which overlaps the re-entrant flange of plate 5 and which retains the packing material 7. Lubricant which flows out of the inner end of the bearing 4 along the shaft 9 is picked up by an oil thrower 12 on the shaft and is thrown centrifugally against the flaring portion of member 11 from where it drains through the opening between plate 5 and member 11 back to packing material 7 in chamber 26. A washer 13 is provided which coacts with the shoulder 12a on shaft 9 to absorb any outward thrust of the shaft which may occur during the rotation thereof.

A portion of the lubricant applied to the bearing surface of shaft 9 by wick 6 flows in the opposite direction toward the outer end of the shaft. An end cap 14 is provided to close the outer opening of outer wall 2 and provide an auxiliary chamber 27 in which most of the lubricant thrown from the end of the shaft 9 is collected. The lubricant thus collected is drained off into the main lubricating chamber 26 through a plurality of return holes 15 which are provided around the periphery of re-entrant wall 3 between the ribs which join wall 3 to outer wall 2. Thus, the lubricant will be drained from the auxiliary chamber into the main lubricating chamber regardless of the position in which the motor is mounted, as long as the shaft 9 is horizontal.

A portion of the lubricant thrown from the end of shaft 9 during horizontal operation is picked up by projection 28 on wick 6 and returned directly to the bearing surfaces. During vertical operation of the motor with the outer end of shaft 9 vertically downward, all of the lubricant thrown from the end of shaft 9 collects on end cap 14 where it is picked up by projection 28 on wick 6. The main lubricant chamber, or reservoir 26 is filled through an opening 16 in the outer wall 2. Opening 16 also serves to support one end of a wick retainer 17, which is shown in detail in Fig. 3 on the accompanying drawing. The wick retainer 17, which has two offset portions connected by an intermediate portion, is made of a material having good resiliency characteristics, such as Phosphor bronze. One flat offset portion of the retainer 17 has an opening 18 and a projection 19. The projection 19 engages opening 16 of wall 2 while the opening 18 in the retainer permits the introduction of lubricant through hole 16 into the lubricating chamber, even though retainer 17 is present. The other offset portion of retainer 17 is composed of three flat tines, 20, 21 and 22. Tines 20 and 21 are coplanar and of equal length, while tine 22 is located below and is somewhat longer than the other two tines. Retainer 17 is maintained in position in the bearing housing by projection 19 engaging hole 16, while tines 21 and 22 engage longitudinal grooves in the sides of two of the supporting ribs which connect outer wall 2 and re-entrant wall 3. Tine 20 engages a groove 23 in radial supporting rib 24, while tine 21 engages a corresponding groove in a corresponding rib on the opposite side of wick 6. The position of retainer 17 causes tine 22 to exert pressure on wick 6 and keep it firmly pressed against the bearing surface of shaft 9. The recess at the bottom of wick 6 which rests on a ledge on bearing wall 3, as previously described, supports one end of wick 6 and aids in maintaining correct alignment. Wick retainer 17 is readily assembled in the bearing housing before packing material 7 and plate 5 are assembled. In order to assemble the retainer, following the insertion of the wick 6, it is necessary only to insert tines 20 and 21 in their respective grooves and snap projection 19 into hole 16.

It is readily apparent from the foregoing description and the accompanying drawing that retainer 17 is a simple part and one which is easy to manufacture. The retainer may be punched from a single sheet of metal. The portion which forms projection 19 is punched from opening 18 and then bent to form the projection. The tines 20, 21 and 22 are cut, after which the offset is formed in the retainer. Tines 20 and 21 are then bent to the correct position, after which tine 22 is bent into position, completing the formation of the retainer.

While I have illustrated and described one preferred embodiment of my invention, modifications thereof will occur to those skilled in the art and, therefore, it should be understood that I intend to cover by the appended claims any such modifications as fall within the true spirit and scope of my invention.

What I claim as new and desire to secure by Letters Patent of the United States is:

1. In a bearing housing having an outer enclosure, a bearing in said housing for rotatably supporting a shaft and having an opening formed therein, and a wick positioned in said opening in contact with said shaft; a bearing wick retainer formed of resilient material having a first flat portion with an opening therein, a projection adjacent said opening for engaging a portion of said housing, a second portion offset from said first portion, and an intermediate portion connecting said second portion and said first portion, said second portion comprising three tines, the two outer tines engaging another portion of said housing, the central one of said tines being offset a different amount than the two outer tines from the said first portion of the retainer for resiliently applying pressure on said wick.

2. In a bearing housing having a flaring outer wall with an opening formed therein, a re-entrant bearing coaxially positioned within said outer wall for rotatably supporting a shaft, said bearing having a lubricating opening therethrough communicating with said shaft, and a wick positioned in said opening in contact with said shaft; a bearing wick retainer formed of resilient material comprising a first flat portion having an opening therein, a second portion offset from said first portion, an intermediate portion connecting said first and second portions, and an outward projection adjacent the opening in said first portion on the side of the opening opposite the junction between said first portion and said intermediate portion for engaging said opening in said outer wall, said second portion comprising three flat tines substantially parallel to said first portion, the two outer tines being coplanar and of equal length for engaging a portion of said housing, the central tine being longer and offset a greater amount than the said outer tines for resiliently applying pressure on said wick.

3. In a bearing construction, the combination of a flaring outer wall having an aperture therein, a re-entrant bearing coaxially positioned within said outer wall for rotatably supporting a shaft, said bearing having a lubricating opening therethrough communicating with said shaft, a plurality of radially disposed supporting ribs connecting said bearing and said outer wall, a plate arranged to provide a closure for the recess formed by said bearing and said outer wall whereby an annular chamber is formed around said bearing, capillary material substantially filling said chamber for feeding lubricant to said shaft, and a resilient retainer member supported jointly by said aperture and by grooves in said ribs for exerting pressure on a portion of said capillary material whereby it is pressed against said shaft through said opening in said bearing.

4. In a bearing construction, the combination of a flaring outer wall having a lubricant supply aperture therein, a substantially annular bearing support having an inner cylindrical bearing surface extending axially inward from said wall for supporting a rotatable shaft, a plurality of radially disposed supporting ribs joining said wall and said bearing support, two adjacent ribs each having a recess in the sidewall thereof nearest the other of the said two ribs, said recesses being substantially parallel to the center line of said shaft, a plate arranged to provide a closure for the annular recess formed by said bearing support and said outer wall whereby an annular chamber is formed around said bearing support, an opening in the wall of said bearing support between said two adjacent ribs, a lubricant-conveying wick positioned in said opening in contact with said shaft, absorbent material substantially filling said chamber for feeding lubricant to said wick, and an offset resilient retainer for the application of pressure on said wick to maintain the wick in contact with said shaft, said retainer having a projection on one offset portion for engaging said aperture and a plurality of tines comprising the other offset portion for engaging said wick and the recesses in said two ribs.

5. A bearing housing comprising a lubricant reservoir, an outer enclosure having at least two recesses on the inner surface thereof, a bearing supported in said housing for rotatably supporting a shaft, a wick in contact with said shaft, absorbent material in said reservoir arranged to feed lubricant to said wick, a lubricant supply opening in said enclosure communicating with said reservoir, and a resilient wick retainer having a projection near one extremity for engaging said opening and a plurality of projections at the opposite extremity for engaging said wick and the recesses in the inner surface of said enclosure whereby said wick is maintained in contact with said shaft.

MAURICE E. BENNETT.

No references cited.